United States Patent
Chen et al.

(10) Patent No.: US 8,960,146 B2
(45) Date of Patent: Feb. 24, 2015

(54) VARIABLE-ANGLE VORTEX GENERATOR

(71) Applicant: MtTek Co., Ltd., TaoYuan (TW)

(72) Inventors: Job Chen, TaoYuan (TW); Ching-Wen Lin, TaoYuan (TW)

(73) Assignee: MtTek Co., Ltd., Taoyuan (TW)

( * ) Notice: Subject to any disclaimer, the term of this patent is extended or adjusted under 35 U.S.C. 154(b) by 0 days.

(21) Appl. No.: 13/935,525

(22) Filed: Jul. 4, 2013

(65) Prior Publication Data

US 2015/0007790 A1 Jan. 8, 2015

(51) Int. Cl.
*F01L 3/00* (2006.01)
*F02M 35/10* (2006.01)
*F02M 35/112* (2006.01)

(52) U.S. Cl.
CPC ... *F02M 35/10118* (2013.01); *F02M 35/10144* (2013.01); *F02M 35/112* (2013.01); *F02M 35/10321* (2013.01); *F05C 2225/08* (2013.01); *F02M 35/10347* (2013.01)
USPC .................................................... 123/184.21

(58) Field of Classification Search
CPC .................. F02M 35/10321; F02M 35/10144; F02M 35/112; F02M 35/10347; F05C 2225/08
USPC ...................................................... 123/184.21
See application file for complete search history.

(56) References Cited

U.S. PATENT DOCUMENTS

| 6,536,420 B1 * | 3/2003 | Cheng ........................... 123/590 |
| 6,837,213 B1 * | 1/2005 | Burnett ......................... 123/306 |
| 7,104,251 B2 * | 9/2006 | Kim .............................. 123/306 |
| 2007/0207048 A1 * | 9/2007 | Stroganov et al. ............ 418/112 |
| 2011/0036314 A1 * | 2/2011 | Yasui et al. .................. 123/90.5 |

* cited by examiner

*Primary Examiner* — Lindsay Low
*Assistant Examiner* — Charles Brauch
(74) *Attorney, Agent, or Firm* — Chun-Ming Shih; HDLS IPR Services

(57) ABSTRACT

A variable-angle vortex generator (10) installed in an intake pipe (100) of an internal combustion engine includes a shaft seat (1), a plurality of vanes (2) and a position restoring mechanism (3). Each vane (2) is arranged radially with an interval apart from each other and pivotally coupled to the shaft seat (1) and each vane (2) has a movable end (21) at an edge of the vane (2). The position restoring mechanism (3) is installed at the shaft seat (1) and includes a synchronizing element (31) for connecting each movable end (21). Each vane (2) is pushed by a fluid to produce a swing movement and let the fluid in the intake pipe (100) form a smooth vortex.

15 Claims, 5 Drawing Sheets

_US 8,960,146 B2_

VARIABLE-ANGLE VORTEX GENERATOR

FIELD OF THE INVENTION

The present invention relates to a flow guiding device used in an intake pipe of an internal combustion engine, and more particularly to a variable-angle vortex generator.

BACKGROUND OF THE INVENTION

In general, a deflector is installed at the front end of an intake pipe of a motor vehicle in order to obtain a larger air intake quantity to increase the power of the engine of the motor vehicle when the engine is running at a high speed.

A traditional deflector includes a plurality of vanes for rotating and flowing a fluid into the intake pipe at a specific angle to form a vortex, so that the vortex can drive air into the engine at a higher speed to increase the air intake quantity of the engine and produce a better combustion or explosion effect of a combustion chamber of the engine.

However, the aforementioned vanes are fixed to the deflector, so that the inclined angle of the vanes cannot be changed. If the quantity of fluid in the intake pipe is small, the interval between adjacent vanes will be too large, and thus the fluid is unable to produce the vortex. On the other hand, if the quantity of fluid in the intake pipe is too large, the interval between adjacent vanes will be too small, and the fluid will be hindered to reduce the air intake quantity of the engine.

In view of the foregoing problems, the inventor of the present invention based on years of experience in the related industry to conduct extensive researches and experiments and developed a variable-angle vortex generator in accordance with the present invention to overcome the problems of the prior art.

SUMMARY OF THE INVENTION

Therefore, it is a primary objective of the present invention to provide a variable-angle vortex generator with each vane pushed by a fluid to produce a swing movement to adjust the inclined angle of each vane and the interval between two adjacent vanes, so as to allow the fluid to enter into an intake pipe and produce a smooth vortex.

To achieve the aforementioned objective, the present invention provides a variable-angle vortex generator installed in an intake pipe of an internal combustion engine, and the variable-angle vortex generator comprises: a shaft seat; a plurality of vanes, arranged radially with an interval apart from each other, and pivotally coupled to the shaft seat, and each vane having a movable end at an edge of the vane; and a position restoring mechanism, installed at the shaft seat, and including a synchronizing element for connecting the movable end of the vane.

The present invention has the following advantages and effects:

1. When the fluid flows in the intake pipe, each vane is pushed by the fluid to produce a swing movement, and each movable end drives the synchronizing element to move in a direction away from the shaft seat, so that each vane is inclined to increase the interval between the vanes to define a spread-open status, so as to allow the fluid to rotate to produce a vortex by a specific angle. As a result, the vortex can enter into the engine at a higher speed to increase the air intake quantity of the engine and provide a better combustion effect of the combustion chamber of the engine.

2. When the quantity of fluid in the intake pipe is small, the pushing force provided by the fluid to the vanes becomes small, so that each vane can maintain its small interval with another vane and has a greater inclined angle and produces fewer vortexes by the small flow of fluid. On the other hand, when the quantity of fluid in the intake pipe is large, the pushing force provided by the fluid to the vanes becomes large, so that each vane maintains a smaller inclined angle and a greater interval which can pass a large flow of fluid and increase the air intake quantity of the fluid provided by the intake pipe to the engine.

3. The variable-angle vortex generator of the present invention further includes a hollow casing passed and fixed into the intake pipe by compression, and each vane is pivotally coupled between the shaft seat and the hollow casing, so that the variable-angle vortex generator can be secured in the intake pipe without requiring additional components for the fixation, so as to achieve the effects of maintaining the variable-angle vortex generator to be secured in the intake pipe when the internal combustion engine is shaken by vibrations and preventing related components from falling off or being separated.

4. The position restoring mechanism further includes a spring and a clamping element, and the clamping element is fixed to the shaft seat, and the synchronizing element is clamped between the shaft seat and the clamping element, and the spring is clamped between the synchronizing element and the clamping element to achieve the automatic position restoring effect by simple components. Therefore, the variable-angle vortex generator has the advantages of simplifying the components and providing an easy assembling process.

5. The synchronizing element has a circular groove at the external periphery of the synchronizing element and two retaining walls formed on both sides of the circular groove, and each movable end is accommodated in the circular groove and blocked between the two retaining walls, so that each movable end is disposed on the same planar position by the pulling force of the two retaining walls, such that each movable end is disposed a the same planar position to maintain each vane to have the same inclined angle and interval to prevent ruining the structure of the vortex or failing to achieve the expected effect of the vortex by unequal inclined angles and intervals, so as to improve the vortex generation rate of the variable-angle vortex generator.

6. Each vane comes with an arc surface which is a parabolic surface formed at an end away from the movable end, and the parabolic surface has an opening aligned towards the position restoring mechanism, so that the end of each vane is protruded higher than the center of the vane to form an arc surface to achieve the effects of guiding the fluid into the intake pipe at a specific angle, rotating the fluid to generate a vortex, improving the generation of vortex from the fluid in the intake pipe, and providing a higher vortex generation rate of the variable-angle vortex generator.

7. The synchronizing element has a circular wall formed at the external periphery of the synchronizing element and extended in a direction towards the clamping element, and the spring is accommodated in the circular wall to limit the position of the spring and prevent an improper deformation caused by the forces produced by the deviation of the spring and maintain a long life of the spring.

8. The end surface of the shaft seat away from the position restoring mechanism is in the shape of a protruding cone. In other words, the end surface of the shaft seat facing the fluid is in the shape of a protruding cone for reducing the resistance of fluid on the shaft seat and guiding the fluid to the positions of the vanes.

9. The hollow casing has a circular deflection block disposed at the internal periphery of the hollow casing and the vanes are extended from the circular deflection block, and the circular deflection block has a circular arc surface with an internal periphery tapered in a direction away from each vane, so that the fluid in the intake pipe can be centralized and blown towards the center of the vanes to improve the efficiency of the vortex generator.

DESCRIPTION OF THE PREFERRED EMBODIMENTS

Figure 1:
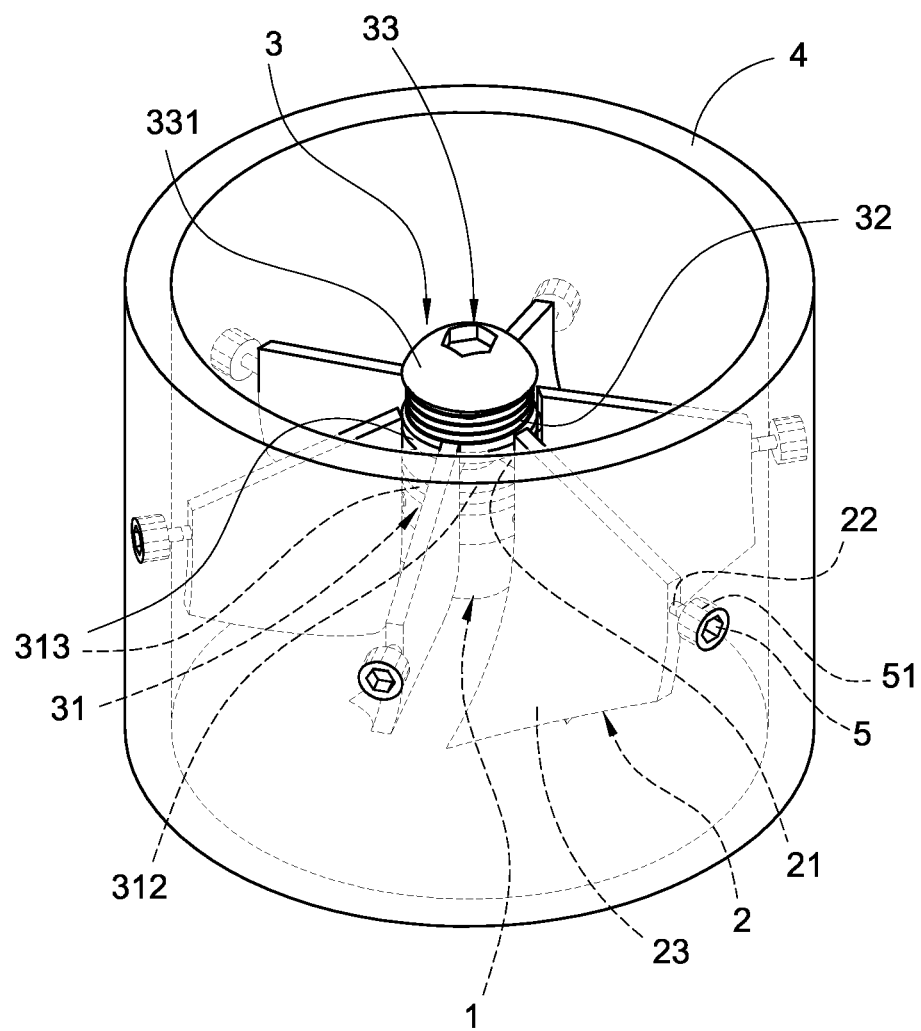
FIG. 1 is a perspective view of a vortex generator of the present invention.
Figure 2:
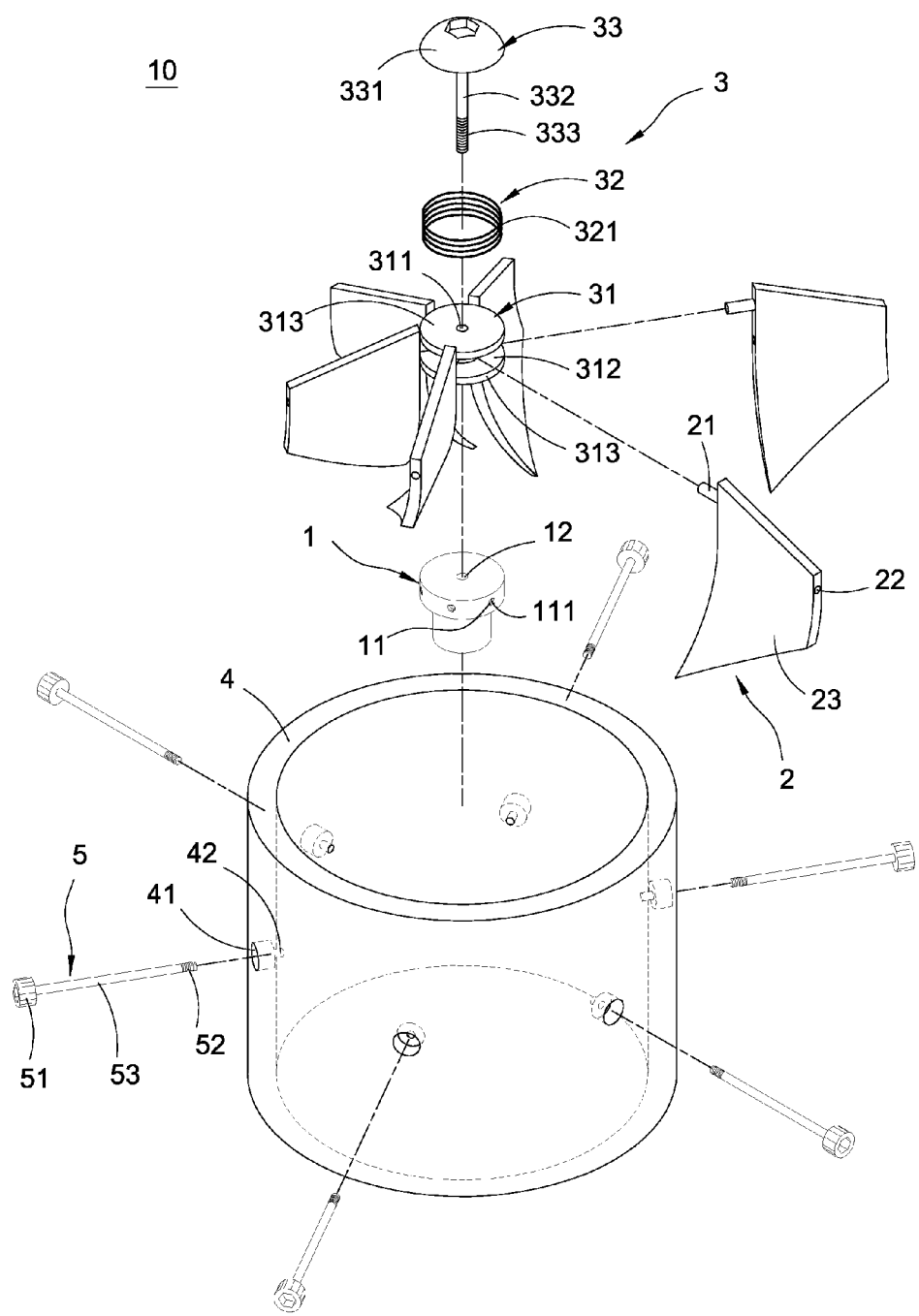
FIG. 2 is an exploded view of a vortex generator of the present invention.

The technical contents of the present invention will become apparent with the detailed description of preferred embodiments accompanied with the illustration of related drawings as follows.

With reference to FIGS. 1 to 6 for a variable-angle vortex generator of the present invention, the variable-angle vortex generator is installed in an intake pipe 100 of an internal combustion engine, and the vortex generator comprises a shaft seat 1, a plurality of vanes 2 and a position restoring mechanism 3.

The shaft seat 1 includes a plurality of corresponding fixing holes 11, each having an internal thread 111 and a through hole 12 formed at an end of the shaft seat 1.

The vanes 2 are arranged radially with an interval apart from each other and pivotally coupled to the shaft seat 1, and each vane 2 has a movable end 21 and a pivoting hole 22, and each vane 2 has an arc surface 23 which is a parabolic surface formed in a direction away from the movable end 21, and an opening of the parabolic surface is aligned towards the position restoring mechanism 3. Wherein, three or more vanes 2 are adopted in this preferred embodiment.

The position restoring mechanism 3 is installed at the shaft seat 1, and the position restoring mechanism 3 comprises a synchronizing element 31 for connecting each movable end 21, so that the movable end 21 and the synchronizing element 31 can be operated together.

When there is no fluid in the intake pipe 100, ends of adjacent vanes 2 are arranged alternately and overlapped with each other. When the fluid enters into the intake pipe 100, each vane 2 is pushed by the fluid to produce a swing movement, and each movable end 21 jointly drives the synchronizing element 31 to move in a direction away from the shaft seat 1, such that each vane is inclined to define a spread-open status. Therefore, the fluid can flow along an inclined angle of each vane 2 and through a gap between any two adjacent vanes 2 to generate the vortex.

The position restoring mechanism 3 further includes a spring 32 and a clamping element 33, and the clamping element 33 is fixed to the shaft seat 1, and the synchronizing element 31 is installed between the shaft seat 2 and the clamping element 33, and the spring 32 is clamped between the synchronizing element 31 and the clamping element 33 to push the synchronizing element 31 in a direction towards the shaft seat 1.

Further, the synchronizing element 31 has a penetrating hole 311, and the spring 32 is a spiral spring 321, and the clamping element 33 has a protrusion 331 and a passing rod 332 extended from the protrusion 331, and a locking section 333 disposed at an end of the passing rod 332, wherein the passing rod 332 is passed and installed to the spiral spring 321 and the penetrating hole 311, and the locking section 333 is fixed to the corresponding through hole 22, and the spiral spring 321 is clamped between the protrusion 331 and the synchronizing element 31.

In addition, the synchronizing element 31 is an I-shaped cylindrical member having a circular groove 312 formed at the external periphery of the synchronizing element 31 and two retaining walls 313 formed on both sides of the circular groove 312 respectively, and each movable end 21 is accommodated in the circular groove 312 and blocked between the two retaining walls 313.

The variable vortex generator 10 of the present invention further comprises a hollow casing 4 passed and fixed into the intake pipe 100 by compression, and each vane 2 is pivotally coupled between the shaft seat 1 and the hollow casing 4. In addition, the hollow casing 4 has a plurality of via holes 41 formed at the periphery of the hollow casing 4 and corresponding to the fixing holes 11 respectively, and a plurality of notches 42 formed at the external periphery of the hollow casing 4 and communicated with the plurality of via holes 41 respectively, wherein the hollow casing 1 includes but not limited to a cylindrical member.

The variable-angle vortex generator 10 of the present invention further comprises a plurality of fixing elements 5, each passing through each via hole 41 and each pivoting hole 22 and being fixed to each fixing hole 11. More specifically, each fixing element 5 has a head 51 disposed at an end of the fixing element 5, an external thread 52 formed at the other end of the fixing element 5, and a pivot rod portion 53 formed between the head 51 and the external thread 52, and each head 51 is engaged with the hollow casing 4, and each external thread 52 is screwed with each corresponding internal thread 111, and each pivot rod portion 53 is pivotally coupled to each corresponding via hole 41 and each corresponding pivoting hole 22, and each head 51 is embedded into each notch 42.

In the assembly of the variable-angle vortex generator 10 of the present invention, each vane 2 is arranged radially with an interval apart with each other and pivotally coupled to the shaft seat 1, and a movable end 21 is disposed at an edge of each vane 2. The position restoring mechanism 3 is installed at the shaft seat 1, and the position restoring mechanism 3 comprises a synchronizing element 31 for connecting each movable end 21. Therefore, each vane 2 can be pushed by a fluid to produce a swing movement to adjust the inclined angle of each vane 2 and the interval between two adjacent vanes 2, so as to allow the fluid to enter into intake pipe 100 to form a smooth vortex.

Figure 3:
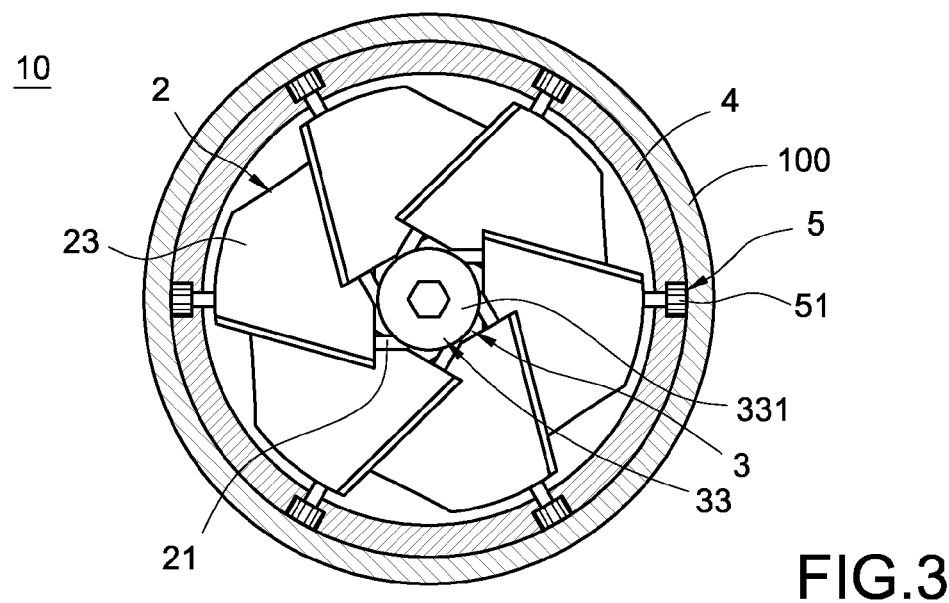
FIG. 3 is a schematic view of using a vortex generator of the present invention.
Figure 4:
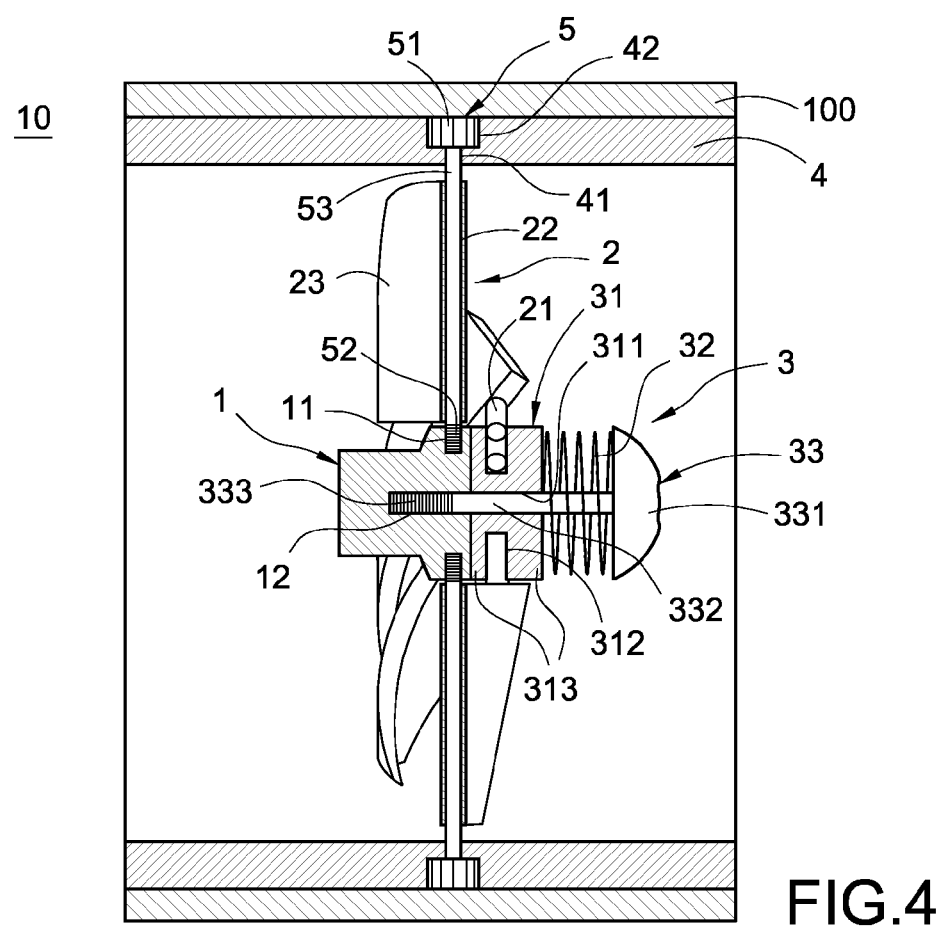
FIG. 4 is a cross-sectional view of a vortex generator of the present invention.
Figure 5:
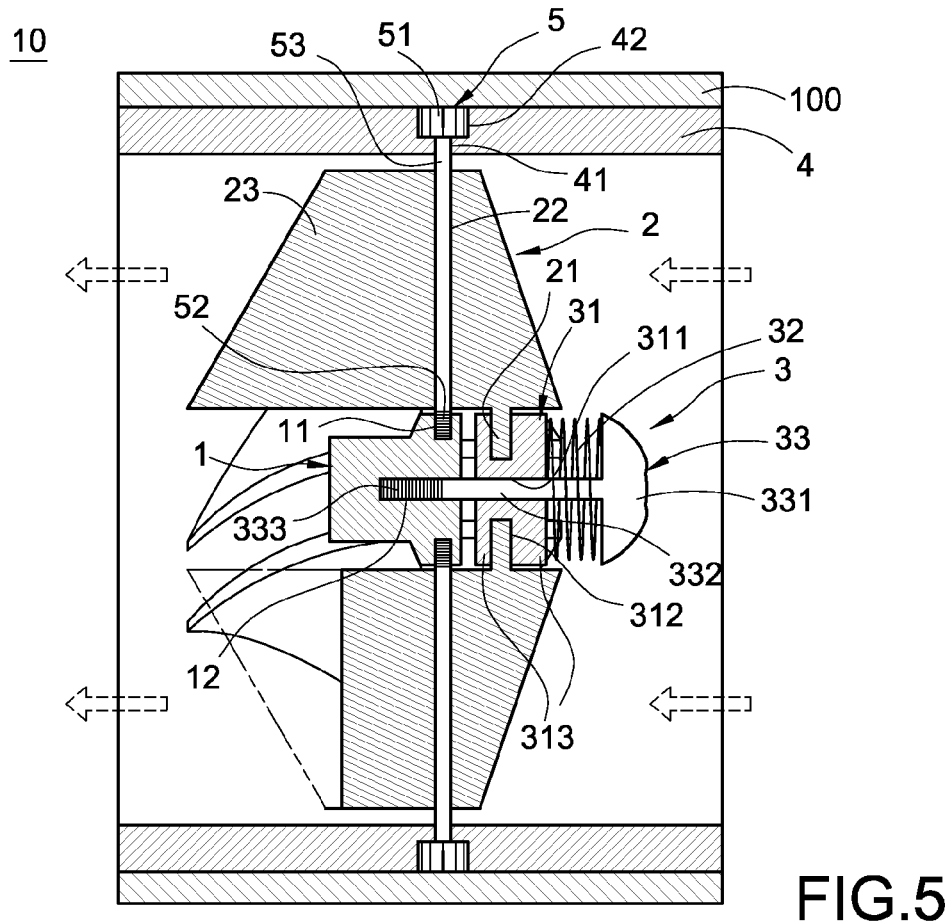
FIG. 5 is another cross-sectional view of a vortex generator of the present invention.
Figure 6:
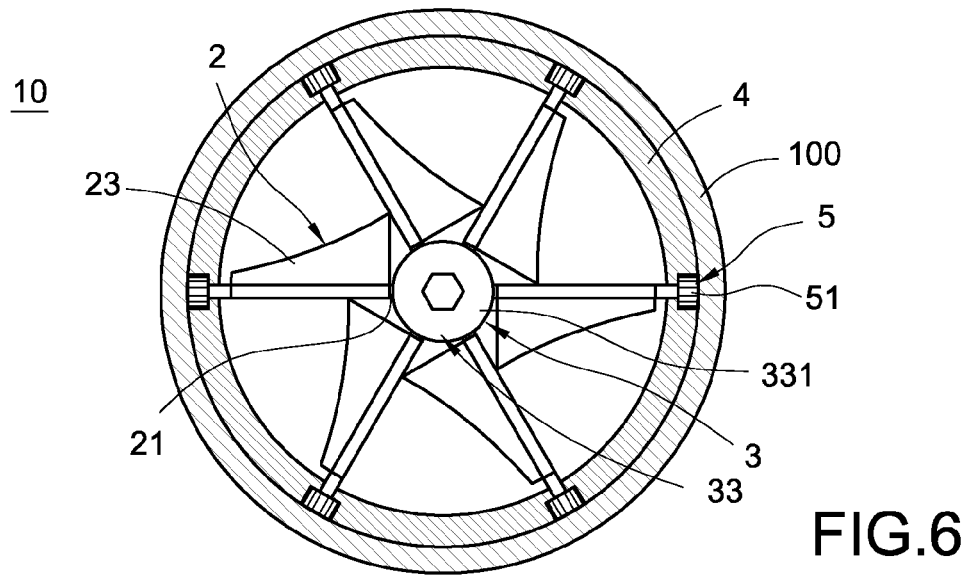
FIG. 6 is another schematic view of using a vortex generator of the present invention.

When there is no fluid flowing in the intake pipe 100 as shown in FIGS. 3 and 4 during the use of the variable-angle vortex generator 10 of the present invention and each movable end 21 is pressed by the synchronizing element 31 to move in a direction towards the shaft seat 1, ends of the adjacent vanes 2 are arranged alternately and overlapped with each other. When there is a fluid flowing in the intake pipe 100 as shown in FIGS. 5 and 6, each vane 2 is pushed by the fluid to produce a swing movement, and each movable end 21 jointly moves the synchronizing element 31 in a direction away from the shaft seat 1, so that each vane is inclined to increase the interval with one another to define a spread-open status, so that the fluid is rotated at a specific angle to form a vortex, and the vortex enters into the engine at a high speed to increase the air intake quantity of the engine, so as to achieve a better combustion effect of the engine combustion chamber.

In addition, if the quantity of fluid in the intake pipe 100 is small, the pushing force provided to the fluid will be small, so that each vane 2 will be maintained at a sharper angle and a smaller interval from one another to further incline the angle of each vane 2 and guide a small flow of fluid to form a vortex. On the other hand, if the quantity of fluid in the intake pipe 100 is large, the pushing force provided by the fluid to the vanes 2 will become large, so that each vane 2 will be maintained at a smaller inclined angle and a greater interval from one another, so that the wider interval between the vanes 2 allows a larger flow of fluid to pass through the intake pipe 100 quickly to increase the air intake quantity of air provided to the engine.

In addition, the variable-angle vortex generator 10 of the present invention further comprises a hollow casing 4 passed and fixed into the intake pipe 100, and each vane 2 is pivotally coupled between the shaft seat 1 and the hollow casing 4, so that the variable-angle vortex generator 10 can be secured in the intake pipe 100 without requiring additional components for the fixation in order to prevent the components from being separated or loosened by the vibrations produced by the internal combustion engine and maintain the vortex generator 10 to be secured in the intake pipe 100.

In addition, the position restoring mechanism 3 further comprises a spring 32 and a clamping element 33, wherein the clamping element 33 is fixed to the shaft seat 1, and the synchronizing element 31 is installed between the shaft seat 2 and the clamping element 33, and the spring 32 is clamped between the synchronizing element 31 and the clamping element 33 to achieve the automatic position restoring effect by simple components, so that the vortex generator 10 has the advantages of simple components and convenient assembling process.

In addition, the synchronizing element 31 has a circular groove 312 formed at the external periphery of the synchronizing element 31 and two retaining walls 313 formed on both sides of the circular groove 312 respectively, and each movable end 21 is accommodated the circular groove 312 and blocked between the two retaining walls 313, so that each movable end 21 can be disposed at the same planar position to maintain the same inclined angle and interval of each vane 2, so as to prevent ruining the structure or the effect of the vortex by the unequal inclined angle and interval of the vanes 2 and achieve a good vortex generation rate of the vortex generator 10.

In addition, each vane 2 has an arc surface 23, and each arc surface 23 is a parabolic surface formed in a direction away from the movable end 21, and an opening of the parabolic surface is aligned towards the position restoring mechanism 3, so that the end of each vane 2 has an arc surface protruded more than that at the center of the vane 2 to guide the fluid from the intake pipe 100 at a specific angle and rotate the fluid to produce a vortex and further improve the efficiency of forming the vortex by the fluid in the intake pipe 100, and provides a good vortex generation rate of the vortex generator 10.

Figure 7:
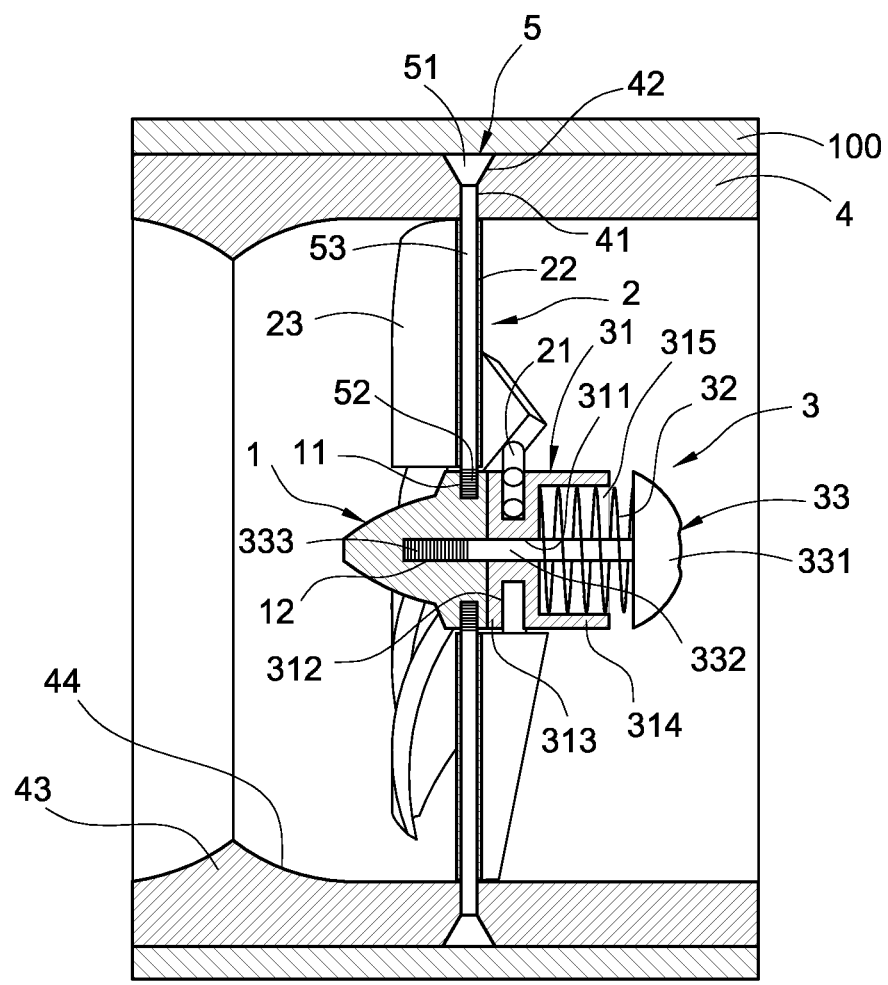
FIG. 7 is a cross-sectional view of a vortex generator in accordance with another preferred embodiment of the present invention.

With reference to FIG. 7 for another preferred embodiment of the present invention vortex generator, the synchronizing element 31 has a circular wall 314 disposed at the external periphery of the synchronizing element and extended in a direction towards the clamping element 33, and a receiving groove 315 formed in the circular wall 314 for accommodating the spring 32, so that the spring 32 is covered by the circular wall 314 to limit the position of the spring 32 to achieve the effects of preventing any improper deformation caused by the deviation of the spring 32, protecting the spring 32, and maintaining a good service life of the spring 32.

In addition, an end surface of the shaft seat 1 away from the position restoring mechanism 3 is in the shape of a protruding cone. In other words, the end surface of the shaft seat 1 facing the fluid is in the shape of a protruding cone to reduce the resistance of the fluid to the shaft seat 1 and guide the fluid to the positions of the vanes 2.

In addition, the hollow casing 4 has a circular deflection block 43 disposed at the internal periphery of the hollow casing 4 and corresponding to the vanes 2, wherein the circular deflection block 43 is a circular block protruded from the hollow casing 4, and the circular deflection block 43 has a circular arc surface 44 with an internal periphery tapered in a direction away from each vane 2, so that the hollow casing 4 has a tapered section with a tapered diameter formed at the front end of each vane 2 for blowing the fluid contained in the intake pipe 100 towards the center of the vanes 2 to improve the efficiency of the vortex generator 10.

In summation of the description above, the present invention achieves the expected objectives and overcomes the drawbacks of the prior art, and the invention complies with patent application requirements, and is thus duly filed for patent application.

While the invention has been described by means of specific embodiments, numerous modifications and variations could be made thereto by those skilled in the art without departing from the scope and spirit of the invention set forth in the claims.

What is claimed is:

1. A variable-angle vortex generator, installed in an intake pipe (100) of an internal combustion engine, comprising:
 a shaft seat (1);
 a plurality of vanes (2), radially arranged with an interval apart from each other, and pivotally coupled to the shaft seat (1), and each vane (2) has a movable end (21) protruding from an edge of the vane (2) and an axle penetrating therein to be fixed to the shaft seat (1), the vane (2) being rotatable along the axle to do a swing movement so that each vane (2) inclines to form a gap between any adjacent two vanes (2) and has a first position and a second position when the plurality of vanes (2) not being pushed and pushed by a fluid, respectively, wherein an axial direction of the axle is not parallel to the fluid direction; and
 a position restoring mechanism (3), including a synchronizing element (31) where the movable end (21) being rotatably disposed therein,
 thereby when the fluid enters into the intake pipe (100), each vane (2) is pushed by the fluid to produce the swing movement along the axle to change to the second position, so that the fluid flows along an inclined angle of each vane (2) and through the gap between any two adjacent vanes (2) to generate a vortex, and when the plurality of vanes are not pushed by the fluid, each vane is pushed back to the first position by an elastic force of the position restoring mechanism (3).

2. The variable-angle vortex generator of claim 1, wherein the vanes (2) are arranged alternately with each other and overlapped with each other.

3. The variable-angle vortex generator of claim 1, further comprising a hollow casing (4) fixed into the intake pipe (100), and each vane (2) is pivotally coupled between the shaft seat (1) and the hollow casing (4).

4. The variable-angle vortex generator of claim 3, further comprising a plurality of fixing elements (5), a plurality of via holes (41) formed at the periphery of the hollow casing (4), a plurality of fixing holes (11) formed on the shaft seat (1) and corresponding to each via hole (41), and each vane (2) having a pivoting hole (22), and each fixing element (5) passing into each via hole (41) and each pivoting hole (22) being fixed to each fixing hole (11).

5. The variable-angle vortex generator of claim 4, wherein each fixing hole (11) has an internal thread (111), and each fixing element (5) has a head (51) disposed at an end of the fixing element (5) and an external thread (52) formed on the other end of the fixing element (5) and a pivot rod portion (53) formed between the head (51) and the external thread (52), and each head (51) is engaged in the hollow casing, and each external thread (52) is screwed to each corresponding internal thread (111), and each pivot rod portion (53) is pivotally coupled to each corresponding via hole (41) and each corresponding pivoting hole (22).

6. The variable-angle vortex generator of claim 5, wherein the hollow casing (4) includes a plurality of notches (42) formed at the external periphery of the hollow casing (4) and interconnected to via holes (41) respectively, and each head (51) is embedded into each notch (42).

7. The variable-angle vortex generator of claim 1, wherein the position restoring mechanism (3) installed at the shaft seat includes a spring (32) and a clamping element (33), and the clamping element (33) is fixed to the shaft seat (1), and the synchronizing element (31) is installed between the shaft seat (1) and the clamping element (33), and the spring (32) is clamped between the synchronizing element (31) and the clamping element (33).

8. The variable-angle vortex generator of claim 7, wherein the shaft seat (1) has a through hole (12) formed at an end of the shaft seat (1), and the synchronizing element (31) has a penetrating hole (311), and the spring (32) is a spiral spring (321), and the clamping element (33) has a protrusion (331), a passing rod (332) extended from the protrusion (331), a locking section (333) disposed at an end of the passing rod (332), and the passing rod (332) is passed through the spiral spring (321) and the penetrating hole (311), and the locking section (333) is fixed to the corresponding through hole (22), and the spiral spring (321) is clamped between the protrusion (331) and the synchronizing element (31).

9. The variable-angle vortex generator of claim 7, wherein the synchronizing element (31) has a circular groove (312) formed at the external periphery of the synchronizing element (31) and two retaining walls (313) formed on both sides of the circular groove (312) respectively, and each movable end (21) is accommodated in the circular groove (312) and retained between the two retaining walls (313), wherein when the fluid enters into the intake pipe (100), each vane (2) in the first position is pushed by the fluid to produce the swing movement along the axle so that the movable end (21) of the vanes (2) pushes the retaining walls (313) upward to space apart the synchronizing element (31) from the shaft seat (1), and wherein when no fluid enters into the intake pipe (100), each vane (2) in the second position rotates back to the first position and the synchronizing element (31) contacts the shaft seat (1) by the elastic force provided by the sprint (32) of the position restoring mechanism (3).

10. The variable-angle vortex generator of claim 7, wherein the synchronizing element (31) includes a circular wall (314) formed at the external periphery of the synchronizing element (31) and extended in a direction towards the clamping element (33), and a receiving groove (315) formed in the circular wall (314) for receiving the spring (32).

11. The variable-angle vortex generator of claim 3, wherein the hollow casing (1) is a circular cylindrical body.

12. The variable-angle vortex generator of claim 1, wherein an end surface of the shaft seat (1) away from the position restoring mechanism (3) is in the shape of a conical protrusion.

13. The variable-angle vortex generator of claim 1, wherein each vane (2) has an arc surface (23).

14. The variable-angle vortex generator of claim 13, wherein each arc surface (23) is a parabolic surface formed in a direction away from the movable end (21), and an opening of the parabolic surface is aligned towards the position restoring mechanism (3).

15. The variable-angle vortex generator of claim 3, wherein the hollow casing (4) includes a circular deflection block (43) extended from the internal periphery of the hollow casing (4) and corresponding to the vanes (2), and the circular deflection block (43) has a circular arc surface (44) with the internal periphery tapered in a direction away from the vanes (2).

* * * * *